Patented Oct. 15, 1946

2,409,372

UNITED STATES PATENT OFFICE 2,409,372

REMOVAL OF ORGANIC FLUORINE

Maryan P. Matuszak, Bartlesville, Okla., assignor to Phillips Petroleum Company, a corporation of Delaware No Drawing. Application January 3, 1944, Serial No. 516,852

10 Claims. (Cl. 196—41)

This invention relates to the treatment of organic materials to remove organic fluorine-containing compounds therefrom. In one general embodiment it relates to the removal from hydrocarbon materials of fluorine-containing organic compounds which are present in relatively minor amounts. In a more specific embodiment my invention relates to the removal of at least a major portion of organically bound fluorine from hydrocarbon materials containing organically bound fluorine in an amount not greater than about 2 per cent by weight, and often in an amount not greater than about 0.1 to about 0.5 per cent by weight. The invention is particularly applicable to such fluorine removal as carried out with the aid of naturally occurring minerals containing silica as an impurity.

In the manufacture of hydrocarbons by processes in which fluorine-containing catalysts are used, small proportions of organic fluorine-containing by-products are often formed. Processes to which my invention may be generally applied involve the alkylation of relatively low-boiling hydrocarbons with olefins, alcohols, ethers, alkyl halides, and the like, to produce higher-boiling hydrocarbons in the presence of catalysts comprising one or more such fluorine compounds as hydrofluoric acid, boron trifluoride, antimony trifluoride, complexes of these with other materials such as are formed by boron trifluoride and water, various organic acids, alcohols, and acids of phosphorus. My invention may also be applied to processes wherein such low-boiling hydrocarbons are isomerized in the presence of such catalysts. The exact nature and composition of the organic-containing by-products which are formed and which are present as impurities in the desired product has not been definitely established, although they are believed to be predominantly alkyl and/or aryl fluorides, but it is known that they are not completely removed by washing the products with alkali solutions, and that they tend to decompose at elevated temperatures such as those employed in fractional distillation of the products, thereby forming hydrofluoric acid which is corrosive, especially in the presence of moisture. In gases they may thus cause corrosion of handling equipment; in liquid motor fuel hydrocarbons they are undesirable for reasons that are obvious.

Two general methods of removing such organic combined fluorine are available. One involves a decomposition of the same under conditions liberating free hydrogen fluoride, which is subsequently removed from the hydrocarbons by distillation or otherwise. The other method involves treatment with a solid porous contact material under conditions binding the fluorine so that the treated hydrocarbon material is not only freed from a substantial part or all of the organically combined fluorine but is also recovered without being contaminated with free hydrogen fluoride. The latter process is described in the copending application of Frederick E. Frey, Serial Number 398,361, filed June 16, 1941, now U. S. Patent 2,347,945, issued May 2, 1944. Among the contact materials which may be used in such a process are those catalytically active for hydrogenation and dehydrogenation reactions, preferably the oxides of various metals, such as the oxides of metals chosen from the group consisting of aluminum, titanium, zirconium, hafnium, thorium, vanadium, chromium, molybdenum, tungsten, uranium, manganese, iron, cobalt, nickel, or the like, alone or in admixture, synthetically produced or in naturally occurring forms such as ores. Due primarily to their low cost and availability, the naturally occurring ores are ordinarily used, and bauxite has been found to be particularly advantageous. Other naturally occurring oxides such as limonite, manganite, baddeleyite, brookite, brucite, diaspore, dysanalite, gibbsite, goethite, heusmannite, huebnerite, ilmenite, lepidocrite, rutile, spinel, valentinite, etc., are also useful.

Unfortunately, natural contact materials of this type contain up to as much as 20 per cent by weight or more of siliceous material, most generally silica, as an impurity. In actual practice, such silica apparently reacts with hydrofluoric acid believed to be formed by decomposition of the organic fluorine compounds before such hydrogen fluoride becomes bound by the porous contact material. At any rate, the formation of silicon tetrafluoride occurs. This silicon tetrafluoride is highly objectionable because it contaminates the hydrocarbon material, and because contact of it with moisture produces hydrofluoric acid, which is exceedingly corrosive, and at the same time deposits gelatinous silicic acid which accumulates until the equipment is plugged. Moreover, the loss of fluorine, in the form of silicon tetrafluoride, is economically undesirable.

An object of this invention is to effect removal of organically combined fluorine from hydrocarbon materials containing the same.

Another object is to effect substantially complete removal of fluorine from hydrocarbon fluids containing organic fluorine compounds as impurities.

Another object is to remove organic fluorine from hydrocarbon materials that have been prepared by a process in which a fluorine-containing catalyst is used.

Another object of the invention is to avoid the formation of silicon tetrafluoride in processes wherein fluorine-containing material is contacted with bauxite or other naturally occurring metal oxide.

Further objects and advantages of my invention will be apparent, to one skilled in the art, from the accompanying disclosure and discussion.

According to this invention, in preferred embodiment, a small proportion of ammonia, usually less than 1 per cent by weight, and preferably not more than approximately the stoichiometric equivalent of the fluorine, such as, for example 0.001 to 0.01 per cent by weight, is added to the hydrocarbon material before contacting with the silicon-containing bauxite or other contact material of the nature described. Hydrofluoric acid present in the hydrocarbon material or formed from the organic fluorine is believed to react with the ammonia to form ammonium fluoride and/or ammonium acid fluoride, whereby it is prevented from forming silicon tetrafluoride. Furthermore, any silicon tetrafluoride which may be formed is converted to ammonium fluosilicate, which is relatively less volatile, so that the hydrocarbon material remains free from this objectionable compound. The ammonium salts are retained by the contact material. The addition of ammonia to the hydrocarbon stream has the practical advantages that pretreatment of the bauxite is unnecessary and that the ammonia can be added in controlled proportion in accordance with need as shown by analysis of the effluent hydrocarbon material. Any ammonia in the hydrocarbon stream in excess of that required for reaction with hydrofluoric acid and/or silicon tetrafluoride appears to be adsorbed by the bauxite and/or the deposited ammonium salt or salts, so that the effluent hydrocarbon stream is ammonia-free. When the bauxite has become spent, the passage of hydrocarbon materials is interrupted, and the bauxite is revivified or replaced.

It will be appreciated that natural ores containing relatively high proportions of silica are more readily available and much cheaper than those having an unusually low silica content. Such advantages of high-silica ores are even more pronounced when compared with synthetically produced materials. My invention may be applied to treatment with materials of low or high silica content to advantage, and the choice of particular contact material will be largely a matter of economic consideration.

When the spent contact mass is to be revivified, it is heated to an elevated temperature at which ammonia and ammonium salts are volatilized. The volatilization may be aided by a flowing atmosphere of an inert carrier gas. Usually, volatilization of all the ammonia and ammonium salts need not be practiced. During the revivification some silica may be removed as silica tetrafluoride and/or ammonium fluosilicate; in fact, in some instances, after revivification the bauxite or other catalyst may contain so little silica that subsequent use of it may be made in the ordinary manner without use of ammonia. The gases and fumes effluent from the revivification may be passed to a recovery step for recovery of ammonia and/or other desired compounds. Ammonia thus recovered may be reused in the process of the present invention.

In carrying out a treatment in accordance with my invention, the hydrocarbon material, containing a small added proportion of ammonia, is passed in the liquid or vapor phase, preferably in the liquid phase, through the contact mass, which is preferably bauxite, at a space velocity of approximately 1 to 10 volumes of liquid per volume of contact mass per hour and at a temperature in the range between about 100 and 350° F. The pressure on the hydrocarbon material, although not critical, is preferably between about 15 and 500 p. s. i. (pounds per square inch), and is chosen to give vapor phase, mixed phase, or liquid phase operation as desired.

In order to illustrate certain features of my invention, the following examples are offered. It will of course be understood that the data given are only exemplary in nature, and hence are not to be so construed as to unduly limit the invention.

In an exploratory experiment, 0.3 gram of ammonia was mixed with 48.5 grams of n-butane containing 0.069 per cent by weight of silicon tetrafluoride. After the mixture had stood overnight, the butane contained only 0.011 per cent by weight of silicon tetrafluoride, indicating that 34 per cent of the silicon tetrafluoride had been converted to compounds of lower volatility by reaction with the ammonia.

In another exploratory experiment, a stream of n-butane containing 0.038 per cent by weight of ammonia was passed through spent bauxite from the bauxite treater of a commercial hydrofluoric acid alkylation plant at a space velocity of 1.4 liquid volumes per volume of catalyst per hour and at a temperature of 180° F. After ammonia amounting to 3.4 per cent by weight of the used bauxite had been adsorbed, a stream of n-butane containing 0.0025 per cent by weight of silicon tetrafluoride was passed through the ammonia-containing bauxite at a space velocity of 1.8 to 2.3 volumes of liquid per volume of contact mass per hour. Substantially complete removal of the silicon tetrafluoride occurred.

In an illustrative specific example, a debutanizer overhead effluent from the hydrofluoric acid alkylation of isobutane with butenes is mixed with 0.005 per cent by weight of ammonia, and the mixture is passed over bauxite. The rate of flow of the hydrocarbon is from 2 to 5 volumes of hydrocarbon per volume of catalyst per hour; the temperature is maintained at 150 to 200° F.; the pressure is sufficient to maintain the hydrocarbon in the liquid phase. Substantially complete removal of the organic fluorine occurs, and the effluent hydrocarbon material is free from silicon tetrafluoride. When spent, the contact mass is heated in a stream of gas, such as natural gas or butane, to remove ammonia and ammonium compounds, which are collected and used for any suitable purpose. The revivified contact mass is suitable for re-use. Any ammonia obtained by the revivification step is recycled to the process.

It will readily be appreciated that while certain specific aspects of the invention have been described in considerable detail, the invention is not to be so construed as to be unduly limited thereby, and various modifications and embodiments may be practiced, by one skilled in the art, by following the teachings of the present disclosure without departing from the spirit thereof or from the scope of the claims.

I claim:

1. The process of removing organic fluorine from hydrocarbon materials containing the same which comprises treating such hydrocarbon materials with a solid contact material comprising a metal oxide catalytically active for hydrogenation and dehydrogenation reactions and containing silica as an impurity, said treating being conducted in the presence of added ammonia under conditions producing a hydrocarbon effluent of substantially reduced fluorine content and substantially free from silicon compounds.

2. The process of removing organic fluorine from hydrocarbon materials containing the same, which comprises treating such hydrocarbon materials with a naturally-occurring solid metal oxide contact material active for removal of organically combined fluorine from hydrocarbon materials and containing a minor amount of silica as an impurity, said treating being conducted in the presence of ammonia under conditions producing a hydrocarbon effluent of substantially reduced fluorine content and substantially free from silicon compounds.

3. A process for treating a hydrocarbon material to remove organically combined fluorine therefrom, which comprises subjecting a hydrocarbon material, containing a minor quantity of organically combined fluorine and also containing ammonia in an amount substantially stoichiometrically equivalent to the fluorine content thereof, to the action of a naturally-occurring solid metal oxide contact material active for removal of organically combined fluorine from hydrocarbon materials and containing a minor amount of silica as impurity, under conditions such that extensive chemical changes in said hydrocarbon material itself are not effected and such that the total effluent from said treatment is substantially free from fluorine in any form and from ammonia and ammonium compounds.

4. The process of claim 3, wherein said naturally-occurring solid metal oxide contact material comprises an alumina.

5. The process of claim 3, wherein said naturally-occurring solid metal oxide contact material is bauxite.

6. The process of claim 3, wherein said naturally-occurring solid metal oxide contact material is an oxide of an iron-group metal.

7. The process of claim 3, wherein said naturally-occurring solid metal oxide contact material is iron oxide.

8. The process of claim 3, wherein, when said contact material becomes incapable of removing fluorine to a desired extent, said contact material is heated in a stream of inert gas to an elevated temperature adequate to effect the volatilization of at least a portion of the ammonium compounds therefrom, and is then reused for said fluorine removal.

9. In a process for the removal of organically combined fluorine from a hydrocarbon material containing the same, wherein such a material is contacted with bauxite containing siliceous impurities under conditions such that extensive chemical changes in said hydrocarbon material itself are not effected and such that the hydrocarbon effluent from said contacting is substantially free of such organically combined fluorine but normally contains volatile compounds of silicon and fluorine, the improvement which comprises admixing with such hydrocarbon material undergoing said contacting a minor quantity of ammonia at least stoichiometrically equivalent to the fluorine content thereof.

10. The process of claim 9, wherein said hydrocarbon material contains not over about 2 per cent by weight of fluorine, is contacted in the liquid phase with bauxite at temperatures between about 100 and about 350° F. at flow rates between about 1 and about 10 volumes per volume bauxite per hour, and in which a hydrocarbon effluent from said contacting is obtained substantially free from silicon and from fluorine.

MARYAN P. MATUSZAK.